Aug. 13, 1929.  F. J. PROWSE ET AL  1,724,514
PROCESS OF CONTROLLING THE SULPHUR DIOXIDE CONTENT OF DRIED FRUIT
Filed May 6, 1925
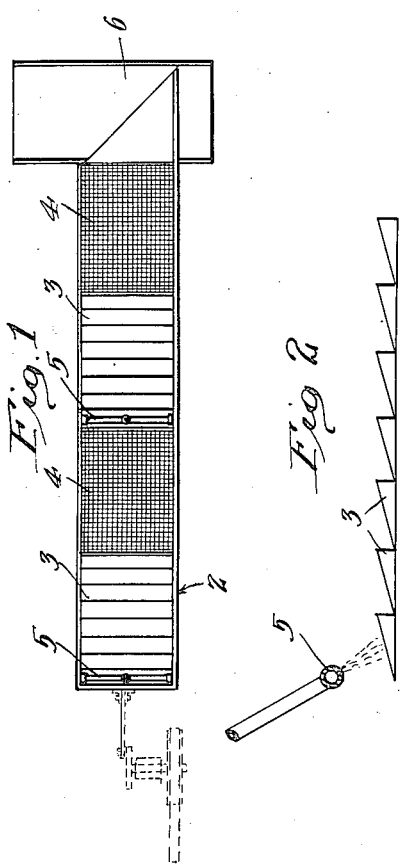
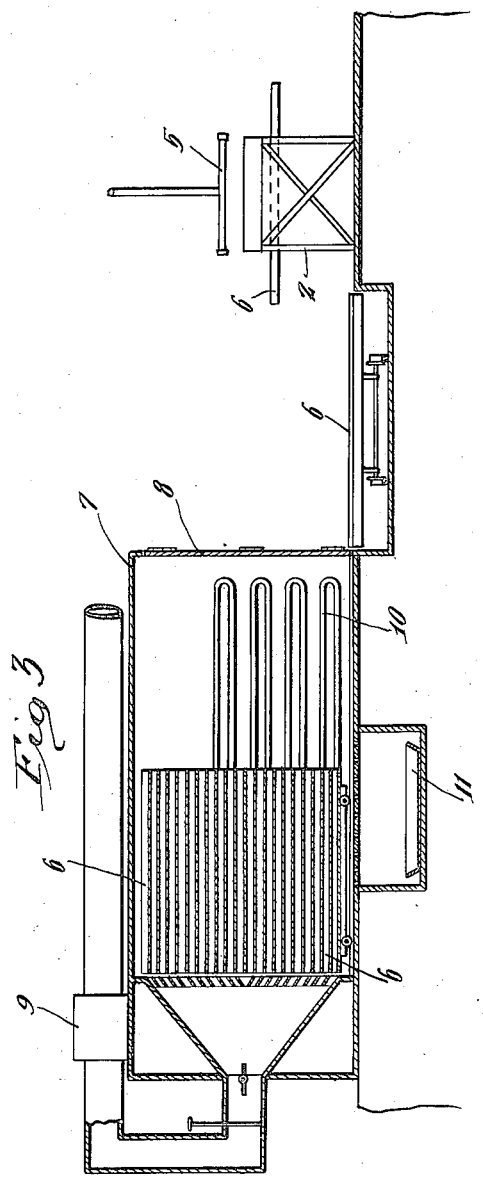

Patented Aug. 13, 1929.

1,724,514

UNITED STATES PATENT OFFICE.

FRANCIS J. PROWSE, OF SAN JOSE, RAYMOND D. ROBINSON, OF OAKLAND, ERNEST M. HALL, OF FRESNO, AND CHARLES F. FLEMING, OF SAN JOSE, CALIFORNIA, ASSIGNORS TO CALIFORNIA PACKING CORPORATION, OF SAN FRANCISCO, CALIFORNIA, A CORPORATION OF NEW YORK.

PROCESS OF CONTROLLING THE SULPHUR-DIOXIDE CONTENT OF DRIED FRUIT.

Application filed May 6, 1925. Serial No. 28,358.

This invention relates to a process of controlling the sulphur dioxide content of dried fruits, such as dried peaches, apricots, prunes, raisins, or other fruits which are treated with sulphur fumes.

In the preparation of dried fruits, of the kinds to which this invention particularly relates, the fruit is sulphured in the first instance by the grower. This is customarily accomplished by subjecting the fruit for a period of time to sulphur dioxide fumes. The length of time that the fruit is exposed to the sulphur dioxide atmosphere, as well as the strength of the sulphur dioxide atmosphere, and the character of the fruit, determines the extent to which the fruit is impregnated with sulphur dioxide. The object of the sulphuring of the fruit is to prevent a subsequent darkening of the fruit and to keep insects away from the same during the sundrying which follows. After the fruit is sulphured and dried, it is forwarded by the grower to a packing-house, where it is stored for a period of time before being packed for market. There is no uniform practice among growers as to the length of time that the fruit is exposed to the sulphur dioxide atmosphere, and this, together with the varying character of the fruit and the fact that the different growers do not employ the same strength of sulphur dioxide atmosphere, results in the treated fruit being received at the packing-house with varying degrees of sulphur dioxide impregnation. Much of this treated fruit arrives at the packing-house with a larger sulphur dioxide content than is desired by the trade or tolerated by law. During the time the treated fruit is stored at the packing-house, the fruit continues to dry, and when desired for packing has become so hard and tough as to be difficult to prepare into an edible product. To prepare the treated fruit for packing, the fruit is cleaned and passed through what is known as a processor, in which the fruit is continuously washed with water. During this washing process, sufficient water is absorbed by the fruit to make it more edible. The fruit is then put into a sulphur-house and is re-sulphured. Different fruits respond more or less rapidly to treatment with sulphur dioxide, and the sulphur dioxide content of the dried fruit being irregular, as has been heretofore explained, it results that with prior methods of handling the fruit leaves the packing-house for the consumer impregnated with widely varying and excessive amounts of sulphur dioxide.

Our invention has for its object controlling the sulphur content of the dried fruit to meet the requirements of the trade and the regulations imposed by law, which are to some extent exceeded in fruit handled in accordance with the prior practice. It has been the accepted theory that the color stability and keeping quality of the fruit is largely dependent upon the sulphur dioxide content of the fruit and that it is necessary at the time of softening and preparing the previously sulphured dried fruit for market to further sulphur the fruit. We have found that the fruit may or may not need to be further sulphured at the time of softening in preparation for market, provided the softened fruit be maintained over a period of time at a proper temperature and in the presence of air or other atmosphere. Although proceeding in accordance with our invention will lessen the sulphur dioxide content of the product, we have found that the color stability and keeping quality of the fruit is not greatly impaired. We account for this by the fact that we have determined that by such treatment the reduction in the sulphur dioxide content of the fruit is accomplished in part by actual extraction of the sulphur dioxide from the fruit, and in part by a conversion of the sulphur dioxide content of the fruit to other unobjectionable sulphur bodies. We control the extraction and conversion of sulphur dioxide so that the sulphur dioxide remaining in the fruit is sufficient to maintain the color stability and keeping quality of the fruit and yet permit a reduction of the sulphur dioxide content of the fruit to within the prescribed limits. By regulatitng the time and conditions of our treatment, we are able to so control the residual sulphur dioxide content of the fruit within greater or lesser limits, and can thus closely prescribe the ultimate sulphur dioxide content of the fruit, accomplishing a result that has long been sought for but never heretofore attained.

The conditions of our process must be varied in accordance with the character of the fruit treated and in accordance with the original sulphur dioxide content of the dried fruit as received from the grower, and our invention is not limited in application to any particular form of apparatus for performing the process. In the accompanying drawings and description, we will describe by way of example an operation embodying this process and the apparatus by which the same has been successfully practiced under conditions of actual use.

In the accompanying diagrammatic drawings

Figure 1 is a plan view of the apparatus by which the fruit is wetted.

Figure 2 is a detailed side-view of the riffles embodied in Fig. 1 and showing the direction of application of the water-spray employed for wetting the fruit.

Figure 3 is a side-elevation partly in section showing the apparatus employed for subjecting the wetted fruit to the sulphur dioxide controlling atmosphere.

Referring to the drawings, when it is desired to prepare and pack the dried sulphur-treated fruit that has been received from the grower, the fruit is delivered to a shaker 2 provided with a plurality of riffles 3 and screens 4. Water is directed upon the fruit at an angle by means of sprays 5. The wetted fruit is passed to a tray 6, upon which tray the fruit is spread. The object of wetting the fruit upon the apparatus last described is to soften the fruit and render it susceptible to the action of the sulphur dioxide controlling atmosphere to which it is next to be subjected. The trays of wetted fruit 6 are then placed within a sulphur-controlling room or chamber 7 having a door 8. The specific arrangement illustrated in Fig. 3 of the drawings embodies a circulating fan 9 for circulating a sulphur-controlling atmosphere through and over the fruit on the trays 6. A heating coil 10 may be provided to heat the room or chamber 7. A pan 11 is provided for burning sulphur if desired to provide a sulphur atmosphere in the room or chamber 7.

It must be understood that the conditions under which the process is operated to control the ultimate sulphur dioxide content of the fruit must vary with different grades of fruit, and in accordance with the extent to which the fruit has been impregnated with sulphur dioxide by the grower. Under certain conditions it will be found advantageous to spray the fruit at 5 with heated water to render more effective the softening of the fruit. It is also contemplated that under certain conditions the wetted fruit may be maintained for a period of time in the chamber or room 7 at an elevated temperature to further soften the fruit. The wetted or softened sulphured fruit is then maintained in the chamber 7 for a period of time during which a sulphur dioxide controlling atmosphere is circulated through or over the fruit. This sulphur dioxide controlling atmosphere will preferably be natural air, although other substitutes will naturally occur to those employing the invention, and any atmosphere may be employed that will serve to remove sulphur dioxide and to convert a portion of the sulphur dioxide content of the fruit to other unobjectionable sulphur bodies. The sulphur dioxide controlling atmosphere may be artificially circulated, such as by the fan 9, or a natural draft may be provided. The length of time during which the softened fruit is maintained under the influence of the sulphur dioxide controlling atmosphere varies in accordance with the character of the fruit, and with the amount of original sulphur dioxide content thereof, and the maximum sulphur dioxide content to be left impregnated in the fruit. The action of the sulphur dioxide controlling atmosphere is to liberate a portion of the original sulphur dioxide content ($SO_2$) of the softened fruit and to convert a portion of the remaining sulphur dioxide content of the fruit into other sulphur bodies. By regulating the conditions of the operation in accordance with the character of the fruit being handled and the original sulphur dioxide content of the fruit, the residual sulphur dioxide content of the fruit may be controlled within the prescribed limits desired. After the sulphur dioxide content of the fruit has been brought within the desired limits the extraction and conversion of the sulphur dioxide content of the softened fruit by the circulation of air is discontinued and the fruit redried.

In view of the varying conditions under which our process may be performed, we shall now set forth by way of example these conditions for a successful operation as actually practiced by us employing the apparatus diagrammatically illustrated in the accompanying drawings. Peaches which have been sulphured by the grower and stored until too hard and tough to be edible, were wetted on the shaker 2 by water having a temperature of approximately 165° to 170° F. Immediately upon receipt of the wetted fruit from the shaker 2 the same was spread upon tray 6 and conveyed to the sulphur-controlling room or chamber 7. The sulphur-controlling room or chamber 7 had been preheated to a temperature of approximately 110° F. The wetted fruit was maintained in the room or chamber 7 for about four hours at a temperature of from approximately 110° to 125° F. in a non-circulating atmosphere of normal air. The fruit having a higher sulphur dioxide content than was ultimately desired for the fruit at the end of the sweating period a sulphur-dioxide controlling atmosphere (moist air) was circulated through the fruit by means of the fan 9. No time limit may be prescribed for continuing the circulation of the sulphur dioxide controlling atmosphere, as that must be determined in accordance with the character of the fruit and the extent to which the same has been impregnated with sulphur dioxide by the grower, and in accordance with the ultimate sulphur dioxide impregnation desired. For example, a certain variety of fruit was received unevenly sulphured by the grower to about 5925 and treated in accordance with this invention to bring the fruit to a uniform reduced sulphur content of about 2590, and a second lot of fruit having an original sulphur dioxide content of about 1725 was reduced to a residual sulphur dioxide content of about 1295, as follows:

|  | Lot No. 1 | Lot No. 2 |
|---|---|---|
| (a) Sweating period: | | |
| Initial temperature | 105° F. | 107° F. |
| Temperature maintained | 123°. | 136°. |
| Time | 48 hours. | 6 hours. |
| (b) Circulating period: | | |
| Temperature maintained | 123° F. | 136° F. |
| Time | 48 hours. | 6 hours. |

We preferably employ a moist sulphur controlling atmosphere to avoid too rapid drying of the fruit, as we find that by maintaining the wetted condition of the fruit the latter is rendered more readily susceptible to the action of the sulphur controlling atmosphere. For this purpose we preferably introduce and condense steam into the chamber 7 during the maintenance of the fruit therein subject to the sulphur controlling atmosphere. We also preferably maintain the chamber 7 at an elevated temperature during the conversion of the sulphur dioxide content of the fruit by the sulphur controlling atmosphere, as we find the latter action more readily proceeds at elevated temperatures.

Our invention is not limited to the details above specified, and the description here contained is for purposes of illustration only. Our invention is of the full scope set forth in the following claims.

We claim:

1. The process of treating previously sulphured dried fruit to control its sulphur dioxide content comprising subjecting the fruit to the action of air at an elevated temperature in the presence of moisture.

2. The process of treating previously sulphured dried fruit to control its sulphur dioxide content comprising washing the fruit with water and subjecting the wetted fruit to to the action of air at an elevated temperature.

3. The process of treating previously sulphured dried fruit to control its sulphur dioxide content comprising wetting the fruit with heated water, maintaining the wetted fruit in a closed chamber at a temperature above 110° to sweat the fruit, and then subjecting the fruit to the action of air at an elevated temperature in the presence of moisture.

4. The process of treating sulphured fruit which comprises softening the fruit with water, draining excess water from the fruit, and heating the fruit in a closed chamber having an atmosphere of high humidity.

5. The process of treating sulphured fruit which comprises exposing the fruit to the action of a moist atmosphere having a temperature in excess of the usual atmospheric temperature until sufficient sulphur dioxide has been removed from the fruit, and cooling the fruit to normal atmospheric temperature.

Signed this 29 day of April, 1925.

FRANCIS J. PROWSE.
RAYMOND D. ROBINSON.
ERNEST M. HALL.
CHARLES F. FLEMING.